April 16, 1963
E. M. ATADAN ET AL
3,085,862
PROCESS FOR THE PRODUCTION OF DINITROGEN
FLUORIDE AND NITROSYL FLUORIDE
Filed March 8, 1960
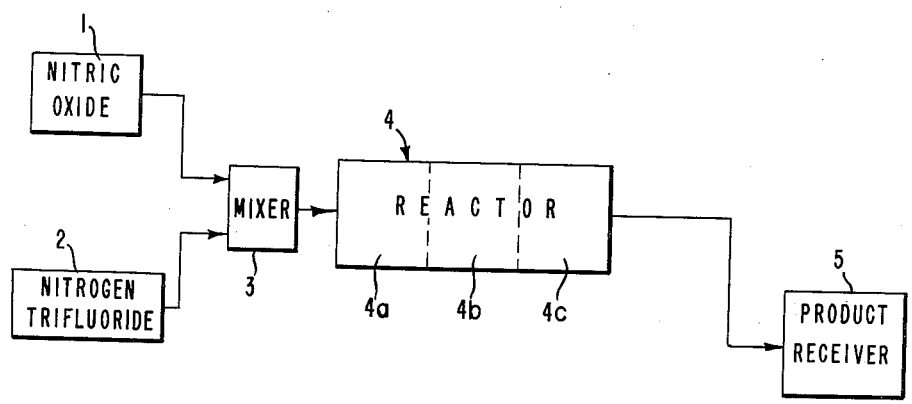
INVENTORS
ERDEM M. ATADAN
FRANK D. MARSH
BY *Ernest H. Beck*
ATTORNEY

United States Patent Office 3,085,862
Patented Apr. 16, 1963

3,085,862
PROCESS FOR THE PRODUCTION OF DINITROGEN FLUORIDE AND NITROSYL FLUORIDE
Erdem M. Atadan, Penns Grove, N.J., and Frank D. Marsh, Wilmington, Del., assignors to E. I. du Pont de Nemours and Company, Wilmington, Del., a corporation of Delaware
Filed Mar. 8, 1960, Ser. No. 13,487
4 Claims. (Cl. 23—203)

The present invention relates to a new method of preparing nitrogen fluorides.

In 1958, Colburn and Kennedy published the first report of the preparation of dinitrogen tetrafluoride, $F_2N—NF_2$, a binary compound of fluorine and nitrogen which also can be named as tetra- or perfluorohydrazine (Journal of the American Chemical Society, volume 80, page 5004). They obtained the tetrafluoride by pyrolysis of nitrogen trifluoride, $NF_3$, over various metals in accord with the equation $2NF_3 + M \rightarrow N_2F_4 + MF$. Dinitrogen tetrafluoride is a valuable chemical intermediate, e.g., is a member of the class of binary fluorides which are suitable for reaction with carbon at very high temperatures according to the methtod of U.S. Patent 2,709,186 to yield fluorocarbons. The use of dinitrogen tetrafluoride as an oxidizer for propellants also has been proposed by Zaebringer (Missiles and Rockets, February 2, 1959, page 36).

Nitrosyl fluoride, NOF, has been known for some time as a useful nitrosating and fluorinating agent. For example, nitrosyl fluoride has been used in preparing cycloalkanone oximes from cycloalkanes (U.S. Patent 2,719,116). Thus, cyclohexanone oxime, a polyamide intermediate, can be prepared from cyclohexane and NOF.

A new process has been discovered for preparing both dinitrogen tetrafluoride and nitrosyl fluoride which is characterized by reliability and by efficiency and economy of operation. In essence, this new process involves contacting of nitrogen trifluoride ($NF_3$) with nitric oxide (NO) at elevated temperature. More specifically, it has been found that $NF_3$ and NO react to give $N_2F_4$ and NOF in up to essentially quantitative conversions and yields when the two reactants are brought into contact at temperatures of about 150 to 950° C. for periods of time ranging from about 15 minutes to 0.01 second, i.e., the longer contact periods corresponding to the lower temperatures.

In order that the process may be more fully understood, attention now is directed to the accompanying drawing which is a diagrammatic representation of an arrangement of apparatus for carrying out the process of the invention. In this diagram, in which such conventional control devices as meters are omitted for the sake of simplification, 1 and 2 are storage vessels for nitric oxide and nitrogen trifluoride, respectively. The vessel 3 is a mixing tank, and 4 is a tubular reactor divided into sections designated generally as 4a, 4b, and 4c. Sections 4a and 4c are provided with cooling means, e.g., jackets for circulation of cold water, and section 4b is provided with heating means, e.g., an electric resistance coil or band heater surrounded by insulation. Vessel 5 is a product-receiving cylinder or trap which may, if desired, be provided with a surrounding jacket or vessel containing means, e.g., liquid nitrogen, for chilling the products rapidly. In operation, NO and $NF_3$ are passed from their respective storage tanks 1 and 2 into vessel 3 where mixing occurs by impingement or suitable mechanical means (not shown). Since the gases in 1 and 2 are stored under pressure, vessel 3 also may be provided with means (not shown) for measuring and adjusting the pressure of the reaction mixture. The mixture prepared in 3 is fed to the adjacent cooled end of reaction zone 4 which is constructed of or internally clad with a material which is heat-resistant and essentially non-reactive with the starting materials and products, e.g., nickel, Monel metal (registered trademark), aluminum, copper, stainless steel, or platinum. Of these, nickel and Monel metal are particularly preferred. The gaseous reaction mass passes from section 4a successively through the heated reaction section 4b and the second cooled section 4c and thence into trap or receiver 5 where the gaseous product mass optionally may be cooled to or below its liquification temperature. The desired products, $N_2F_4$ and NOF, can be separated from the crude condensed product mass by methods to be described more fully hereinafter. Again, the separated products, particularly the NOF, should be stored in cylinders or tanks made of or lined with a suitable nonreactive material.

Although the foregoing describes a suitable arrangement for effecting the present process, the invention is not limited to any specific mode of operation or arrangement of equipment. The process can be carried out batchwise, as well as in continuous flow systems, and the reactant gases can be fed into the reaction zone separately, as well as in admixture. The heated chamber can, if desired, be packed with inert bodies, such as nickel balls, to improve heat transfer and contact between the reactants. The chilling of the reactant gases prior to passage into the heated reaction zone is not a critical feature but merely one of several possible means of providing control of reactor volume and temperature.

The nitrogen trifluoride used as starting material in the present process can be prepared by several known procedures, including reaction of ammonia with elemental fluorine, electrolysis of certain molten fluorides, and electrolysis of urea in anhydrous hydrogen fluoride. The nitric oxide employed may be the commercially available material containing minor amounts of nitrogen and nitrous oxide ($N_2O$). Ammonia oxidation product gases consisting principally of nitrogen and a minor proportion of nitric oxide also are suitable. In other words, one or both of the reactant gases may contain or be diluted by gases which are substantially inert in the process. Suitable diluent gases include not only nitrogen but also the rare gases such as argon, helium, etc. Oxygen and compounds which can yield free oxygen under the process conditions, including the higher nitrogen oxides, are generally undesirable in that oxygen will react with the products, particularly the dinitrogen tetrafluoride, with consequent lowering of the yields obtained. Accordingly, it is preferred that the feed streams be substantially free of oxygen and materials which are oxygen-producers under the reaction conditions.

The following specific examples offer further illustration of the process. The principal overall reaction involved can be illustrated by the equation:

$$NF_3 + NO \rightarrow \tfrac{1}{2} N_2F_4 + NOF$$

In the examples, the "percents" and "parts" are by volume, and the theoretical product compositions mentioned are those which would be obtained on quantitative conversion of the limiting reactant, based on the foregoing stoichiometry. Both the reactant and product gas compositions were determined by analysis of aliquot portions, gas chromatographic, infrared, and mass spectrographic procedures being used as indicated. Nitrosyl fluoride cannot be distinguished from nitric oxide by either mass spectrometry or gas chromatography, but the two can be differentiated by infrared analysis.

Example 1

The reactor used was fabricated from 48 inches of 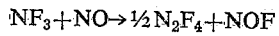⅜-inch-O.D. nickel tubing which had an inside diameter of ¼ inch. The reaction zone was a centrally positioned section 8 inches in length heated by an insulated resistance furnace to a maximum of 607° C. Immediately adjacent either end of the heated zone, 6-inch sections were provided with jackets for circulation of cooling water. The remaining 12-inch portions of the tubing at either end of the cooled zones were at ambient temperature and served, respectively, as inlet and discharge zones. A gaseous mixture was determined by gas chromatography to contain 49% $NF_3$, 44% NO, 4.7% $N_2O$, and 1.5% $N_2$. This mixture was passed at atmospheric pressure through the reactor at a flow rate such that the contact time in the heated zone was approximately 0.25 second. The cooled gaseous product mixture was discharged into a liquid-nitrogen-cooled receiver through an interconnected gas chromatographic analyzer unit. Two samples of the product gas were taken 19 and 69 minutes, respectively, after start of operation. The analyses showed the following product compositions.

[Percent]

| Time (min.) | $N_2F_4$ | NOF | $NF_3$ | $N_2O$ | $N_2$ |
|---|---|---|---|---|---|
| 19 | 25.5 | 58 | 5.1 | 6 | 1.7 |
| 69 | 27.5 | 59 | 5.5 | 6 | 1.8 |

The theoretical product composition based on quantitative conversion of the nitric oxide charged would have been:

[Percent]

| $N_2F_4$ | NOF | $NF_3$ | $N_2O$ | $N_2$ |
|---|---|---|---|---|
| 27.9 | 55.8 | 6.3 | 6 | 1.9 |

Example 2

The following runs were carried out by the general method of Example 1. (Minor variations in procedure are noted in the individual runs.)

| Run | A | B[1] | C[2] |
|---|---|---|---|
| Feed composition (percent): | | | |
| $NF_3$ | 52 | 8.2 | 55 |
| NO | 40 | 77 | 41 |
| $N_2F_4$ | 1.6 | 3.5 | |
| $N_2O$ | 1.8 | 3.5 | 1 |
| $N_2$ | 3.6 | 5.2 | 3 |
| Reaction temp. (° C.)[3] | 607 | 721 | 504 |
| Contact time (sec.) | 0.25 | 0.027 | 0.74 |
| Actual product composition after specified time of operation, minutes | 19    37    55 | 0.5 | 12 |
| $N_2F_4$, percent | 25   26   26.2 | 6.4 | 16.1 |
| NOF, percent | 47   47   50 | [4] | 32 |
| $NF_3$, percent | 17   15   15 | Trace | 27 |
| NO, percent |  |  [4]  |  |
| $N_2O$, percent | 3    2.7   3 | 7.3 | 2 |
| $N_2$, percent | 4.5   4.7   6.0 | 5.2 | [4] |
| Theor. product composition (percent): | | | |
| $N_2F_4$ | 26 | 7.9 | 25.8 |
| NOF | 48 | 8.6 | 51.6 |
| $NF_3$ | 15 | 0 | 17.6 |
| NO | 0 | 71.7 | 0 |
| $N_2O$ | 2.2 | 3.6 | 1.3 |
| $N_2$ | 4.5 | 5.4 | 3.8 |

[1] The reactor used was fabricated from ¼ inch I.D. nickel pipe 36 inches long; the heated section was 6.5 inches long.
[2] The reactor was similar to that of Example 1, except that heated zone was 15 inches long. Analysis of the feed mixture was by mass spectrometry; that of the product mixture was by infrared.
[3] Maximum temperature of reaction zone.
[4] Not determined.

Example 3

The reactor and conditions were those of Example 1. Analysis by vapor chromatography showed the feed mixture to contain 29.6% NO, 51% $NF_3$, 13% $N_2F_4$, 5.1% $N_2O$, and 1.5% $N_2$. The cooled product stream was collected in an initially evacuated stainless steel cylinder and, by the same method of analysis, had the following composition: 33% $N_2F_4$, 35% NOF, 25% $NF_3$, 6.3% $N_2O$, and 1.85% $N_2$. Based on quantitative conversion of the limiting reactant, nitric oxide, the product composition should have been: 32.7% $N_2F_4$, 34.7% NOF, 24.9% $NF_3$, 5.9% $N_2O$, and 1.8% $N_2$. The product stream was passed through a scrubber containing sufficient chilled 2 N sodium hydroxide solution to react with all the NOF in the product gas. The NOF-free mixture then was freed of the major portion of its $NF_3$, NO, and $N_2O$ content by chilling to a temperature in the range of about −180° C. in a cylinder placed in a liquid-nitrogen-chilled petroleum ether bath and thereafter allowing nitric oxide, nitrogen trifluoride, and nitrous oxide to distill into a common liquid nitrogen-cooled receiver. (The nitric oxide had formed by reaction of some of the NOF with the stainless steel cylinder.) The distillation was continued until the vapor pressure of the distilland was a maximum of about 150 mm. Hg. Subsequent analysis of this residue showed it to be 92% $N_2F_4$, 6% $N_2O$, and a maximum of 2% NO-plus-$NF_3$. Including the material removed for analytical samples, the $N_2F_4$ recovery in the distillation was very nearly quantitative.

The dinitrogen tetrafluoride obtained by the foregoing procedure of scrubbing the cooled (to or below 100° C.) product stream with aqueous sodium hydroxide and fractionation is sufficiently pure for many applications but can be purified further by vapor chromatography procedures, including the use of molecular sieves, e.g., anhydrous, porous sodium and calcium aluminosilicates of 5 A. pore size. The nitrosyl fluoride produced can also be removed by contacting the product gases before chilling with a metal, preferably a metal other than an alkali or alkaline-earth metal in particulate form. If it is desired to recover intact not only the dinitrogen tetrafluoride but also the nitrosyl fluoride, then careful vacuum fractionation can be used, followed, if desired, by vapor chromatography to obtain the dinitrogen tetrafluoride in very pure form.

The present process can be operated satisfactorily over a rather wide temperature range, namely, from about 150 to 950° C., without encountering unduly low reaction rates on the one hand and excessive product decomposition and side reactions on the other. For greatest efficiency and economy, operation in the range of about 500 to 800° C. is generally preferred. The pressure under which the process is operated is not critical. Generally speaking, however, we prefer to operate a continuous flow process at atmospheric or only slightly elevated pressures.

The overall stoichiometry of the present process mentioned heretofore requires equimolar amounts of nitrogen trifluoride and nitric oxide. However, in actuality, the molar ratio of nitrogen trifluoride to nitric oxide may vary widely, e.g., from about 0.1/1 to 10/1 or even higher. A preferred range for obtaining good conversion to dinitrogen tetrafluoride is between about 0.5 and about 2 moles of nitrogen trifluoride per mole of nitric oxide.

The contact time in the present process will generally range from 0.01 second to 15 minutes or more, particularly from about 0.02 to 200 seconds, the longer periods corresponding to the lower temperatures. When the temperature is within the preferred range, i.e., at or about 500° C., and dinitrogen tetrafluoride is desired in high yield, the reaction preferably is conducted with no substantial excess of nitric oxide over the stoichiometric requirement or, when the nitric oxide is in excess, the contact period is limited to relatively short periods, e.g., a maximum of about 10 seconds and preferably a maximum of about 2 seconds, to avoid loss of the dinitrogen tetrafluoride by side reactions. The contact period in reactions conducted above 500° C. is of less consequence when nitrosyl fluoride is desired as the chief product and/or when the nitrogen trifluoride is in excess. In the latter case, maximum yields of dinitrogen tetrafluoride can generally be obtained when the contact period is up to about 100 seconds, particularly up to about 20 seconds.

The present process has been described in detail in the foregoing, but many alternatives within the scope of the invention will be apparent to those skilled in the art. The invention therefore will be limited only by the following claims.

We claim:

1. A process for the production of at least one member of the group consisting of dinitrogen tetrafluoride and nitrosyl fluoride which comprises contacting nitrogen trifluoride with nitric oxide at a temperature of 150 to 950° C. for a contact period of about 15 minutes to about 0.01 second and in an environment substantially free of oxygen and oxygen liberators under said process conditions.

2. The process of claim 1 wherein the reaction product is cooled to a maximum temperature of about 100° C. and thereafter contacted with aqueous alkali hydroxide to remove substantially all of said nitrosyl fluoride.

3. The process as claimed in claim 2, wherein the said reaction product substantially free of nitrosyl fluoride is subjected to the additional and subsequent step of fractional distillation to separate dinitrogen tetrafluoride of high purity.

4. The process as claimed in claim 2, wherein the said reaction product substantially free of nitrosyl fluoride is subjected to the additional and subsequent step of gas chromatography to separate dinitrogen tetrafluoride of high purity.

References Cited in the file of this patent

Jacobson, "Encyclopedia of Chemical Reactions," vol. 5, 1953, page 193; Chapman and Hall, New York and London.

"Fluorine Chemistry," vol. 1, pages 86 and 87, by Simons; Academic Press, Inc., publ. New York.